(12) United States Patent
Pappas

(10) Patent No.: US 7,163,220 B2
(45) Date of Patent: Jan. 16, 2007

(54) SLIDER MECHANISM FOR A VEHICLE

(75) Inventor: George Pappas, Fort Wayne, IN (US)

(73) Assignee: Tuthill Transport Technologies, Burr Ridge, IL (US)

( * ) Notice: Subject to any disclaimer, the term of this patent is extended or adjusted under 35 U.S.C. 154(b) by 360 days.

(21) Appl. No.: 10/715,865

(22) Filed: Nov. 18, 2003

(65) Prior Publication Data
US 2005/0104316 A1    May 19, 2005

(51) Int. Cl.
B62D 33/077    (2006.01)

(52) U.S. Cl. .................. 280/149.2; 280/405.1

(58) Field of Classification Search ............. 280/124.1, 280/124.109, 149.2, 405.1
See application file for complete search history.

(56) References Cited

U.S. PATENT DOCUMENTS

| 2,417,504 | A |   | 3/1947  | Knaggs et al. |         |
|-----------|---|---|---------|---------------|---------|
| 2,668,455 | A |   | 2/1954  | Herrmann      |         |
| 2,818,272 | A |   | 12/1957 | De Lay        |         |
| 2,935,332 | A |   | 5/1960  | Delay         |         |
| 3,096,993 | A | * | 7/1963  | McKay ...................... | 280/81.1 |
| 3,146,000 | A |   | 8/1964  | Holzman       |         |
| 3,177,002 | A | * | 4/1965  | Schmidt ..................... | 280/81.1 |
| 3,365,211 | A |   | 1/1968  | Ginsburg      |         |
| 3,372,946 | A |   | 3/1968  | Hutchens      |         |
| 3,653,652 | A | * | 4/1972  | Lindberg, Jr. ................ | 267/71 |
| 3,778,079 | A |   | 12/1973 | Vornberger    |         |
| 4,273,347 | A |   | 6/1981  | Hulse         |         |
| 4,353,565 | A |   | 10/1982 | Smith et al.  |         |
| 4,838,566 | A |   | 6/1989  | Baxter et al. |         |
| 4,838,578 | A | * | 6/1989  | Baxter ...................... | 280/149.2 |
| 5,088,763 | A | * | 2/1992  | Galazin et al. ............. | 280/656 |
| 5,137,296 | A |   | 8/1992  | Forman        |         |
| 5,199,732 | A |   | 4/1993  | Lands et al.  |         |
| 5,314,201 | A |   | 5/1994  | Wessels       |         |
| 5,449,187 | A | * | 9/1995  | Schueman ............... | 280/149.2 |
| 5,480,171 | A |   | 1/1996  | Cheffey       |         |
| 5,564,725 | A | * | 10/1996 | Brazeal .................... | 280/149.2 |
| 6,260,833 | B1 | * | 7/2001 | Drager ........................ | 267/72 |
| 6,279,933 | B1 | * | 8/2001 | Ross et al. ............... | 280/149.2 |
| 6,322,091 | B1 | * | 11/2001 | Lindley ................... | 280/149.2 |
| 6,345,583 | B1 | * | 2/2002 | Thackston et al. .......... | 114/213 |
| 2003/0214111 | A1 | * | 11/2003 | Browning ................ | 280/149.2 |

* cited by examiner

Primary Examiner—Eric Culbreth
Assistant Examiner—Barry Gooden, Jr.
(74) Attorney, Agent, or Firm—George Pappas

(57) ABSTRACT

A slider assembly provides a connection between a vehicle body and a vehicle suspension. The slider assembly includes a frame and a locking mechanism attached to the frame. The locking mechanism s a locking pin that is connected to an extension spring, a pivot arm that is movable between a locked position and an unlocked position, and a compression spring that is connecting the pivot arm and the locking pin. When the pivot arm is in the locked position, the compression spring does not exert a bias on the locking pin and the extension spring exerts a bias on the locking pin so as to bias the locking pin into engagement with the vehicle body so as to secure together the vehicle body and the vehicle suspension. When the pivot arm is in the unlocked position, the compression spring exerts a bias on the locking pin that overcomes the bias of the extension spring on the locking pin thereby biasing the locking pin out of engagement with the vehicle body so that the vehicle body is slidable with respect to the vehicle suspension.

27 Claims, 10 Drawing Sheets

SLIDER MECHANISM FOR A VEHICLE

BACKGROUND

The present invention pertains to a mechanism that permits selective longitudinal movement between a vehicle body and the vehicle suspension. More specifically, the present invention pertains to a slider mechanism wherein the vehicle suspension may selectively be placed in a locked condition with respect to the vehicle body and an unlocked condition wherein the vehicle suspension is longitudinally movable with respect to the vehicle body.

Early on devices have been utilized with trailer frames to provide for the ability to adjust the position between a main frame and an auxiliary frame. U.S. Pat. No. 2,818,272 to De Lay and U.S. Pat. No. 2,935,332 to De Lay are exemplary of these devices.

In the past, a slider assembly has also been used to provide for the selective adjustment of the relative position of the vehicle body and the vehicle suspension. In this regard, U.S. Pat. No. 4,838,566 to Baxter et al, U.S. Pat. No. 4,838,578 to Baxter et al., U.S. Pat. No. 5,480,171 to Chetley, and U.S. Pat. No. 3,778,079 to Vornberger et al. each disclose a slider assembly that uses locking pins to provide selective engagement between the vehicle suspension and the vehicle body.

Other patents show various arrangements that provide for the adjustment of structural components of the trailer assembly so as to be able to balance or compensate for the load carried by the trailer. These patents include U.S. Pat. No. 3,146,000 to Holzman, U.S. Pat. No. 3,365,211 to Ginsburg, U.S. Pat. No. 3,372,946 to Hutchens, U.S. Pat. No. 4,286,797 to Mekosh Jr., et al., U.S. Pat. No. 4,353,565 to Smith et al., U.S. Pat. No. 5,137,296 to Forman, and U.S. Pat. No. 5,199,732 to Lands et al. Still other patents show a connection between an assembly that provides for the selective adjustment of the relative position of the vehicle body and the vehicle suspension and a safety device. Exemplary patents are U.S. Pat. No. 4,273,347 to Hulse and U.S. Pat. No. 5,314,201 to Wessels.

While the above arrangements operate to selectively slide and attach a vehicle body and vehicle suspension, there remains a desire to provide an improved slider arrangement that selectively connects the vehicle body and the vehicle suspension and which is effective, easy to operate and yet relatively inexpensive to manufacture.

SUMMARY

In one form thereof, the invention is a slider assembly that provides a connection between a vehicle body and a vehicle suspension. The slider assembly comprises a frame and a locking mechanism attached to the frame. The locking mechanism comprises a locking pin that is connected to an extension spring, a pivot arm that is movable between a locked position and an unlocked position, and a compression spring that is connected between the pivot arm and the locking pin. When the pivot arm is in the locked position, the compression spring does not exert a bias on the locking pin and the extension spring exerts a bias on the locking pin so as to bias the locking pin into engagement with the vehicle body so as to secure together the vehicle body and the vehicle suspension. When the pivot arm is in the unlocked position, the compression spring exerts a bias on the locking pin that overcomes the bias of the extension spring on the locking pin thereby biasing the locking pin out of engagement with the vehicle body so that the vehicle body is slidable with respect to the vehicle suspension.

In another form thereof, the invention is a slider assembly that provides a connection between a vehicle body and a vehicle suspension. The slider assembly comprises a frame and a locking mechanism that is attached to the frame. The locking mechanism comprises a first locking pin that is connected to a first extension spring, a first pivot arm that is movable between a locked position and an unlocked position, a first compression spring that connects the pivot arm and the first locking pin, a second locking pin that is connected to a second extension spring, and a second compression spring that connects the first pivot arm and the second locking pin.

When the first pivot arm is in the locked position, the first compression spring does not exert a bias on the first locking pin and the first extension spring exerts a bias on the first locking pin so as to bias the first locking pin into engagement with the vehicle body so as to secure together the vehicle body and the vehicle suspension, and the second compression spring does not exert a bias on the second locking pin and the second extension spring exerts a bias on the second locking pin so as to bias the second locking pin into engagement with the vehicle body so as to secure together the vehicle body and the vehicle suspension. When the pivot arm is in the unlocked position, the first compression spring exerts a bias on the first locking pin that overcomes the bias of the first extension spring on the first locking pin thereby biasing the first locking pin out of engagement with the vehicle body so that the vehicle body is slidable with respect to the vehicle suspension, and the second compression spring exerts a bias on the second locking pin that overcomes the bias of the second extension spring on the second locking pin thereby biasing the second locking pin out of engagement with the vehicle body so that the vehicle body is slidable with respect to the vehicle suspension.

In still another form, the invention is a vehicle that includes a vehicle body, a vehicle suspension, and a slider assembly that connects the vehicle body and the vehicle suspension. The slider assembly is movable between a locked condition wherein the vehicle body and the vehicle suspension are secured together and an unlocked condition wherein the vehicle body and the vehicle suspension are adjustable with respect to each other. The slider assembly comprises a frame assembly that includes a locking mechanism. The locking mechanism comprises a locking pin that is connected to an extension spring, a pivot arm that is movable between a locked position and an unlocked position, a compression spring that connects the pivot arm and the locking pin. When the pivot arm is in the locked position the compression spring does not exert a bias on the locking pin so that the extension spring biases the locking pin into engagement with the vehicle body so as to secure together the vehicle body and the vehicle suspension. When the pivot arm is in the unlocked position the compression spring exerts a bias on the locking pin so as to overcome the bias of the extension spring so as to bias the locking pin out of engagement with the vehicle body so that the vehicle body is slidable with respect to the vehicle suspension.

In yet another form thereof, the invention is a slider assembly that provides an operative connection between a vehicle body and a vehicle suspension. The slider assembly comprises a frame assembly that operatively connects the vehicle body and the vehicle suspension. The frame assembly includes a locking mechanism. The locking mechanism comprises a locking pin that is connected to an extension means for exerting an extension bias on the locking pin so as to bias the locking in into a locked position, a pivot arm that is movable between a locked position and an unlocked position, and a compression means, connecting the pivot arm, for selectively exerting a compression bias on the locking pin wherein the compression bias acts to overcome the extension bias and bias the locking pin to an unlocked position.

When the pivot arm is in the locked position the compression means does not exert a bias on the locking pin so that the extension means biases the locking pin into engagement with the vehicle body so as to secure together the vehicle body and the vehicle suspension. When the pivot arm is in the unlocked position the compression means exerts the compression bias on the locking pin so as to overcome the extension bias of the extension means so as to bias the locking pin out of engagement with the vehicle body so that the vehicle body is slidable with respect to the vehicle suspension.

BRIEF DESCRIPTION OF THE DRAWINGS

The above-mentioned and other features and objects of this invention and the manner of obtaining them will become more apparent and the invention itself will be better understood by reference to the following description of embodiments of the invention taken in conjunction with the accompanying drawings wherein.

The exemplifications set out herein illustrate preferred embodiments of the invention in one form thereof and such exemplifications are not to be construed as limiting the scope of the disclosure or the scope of the invention in any manner.

DETAILED DESCRIPTION

Figure 1A:
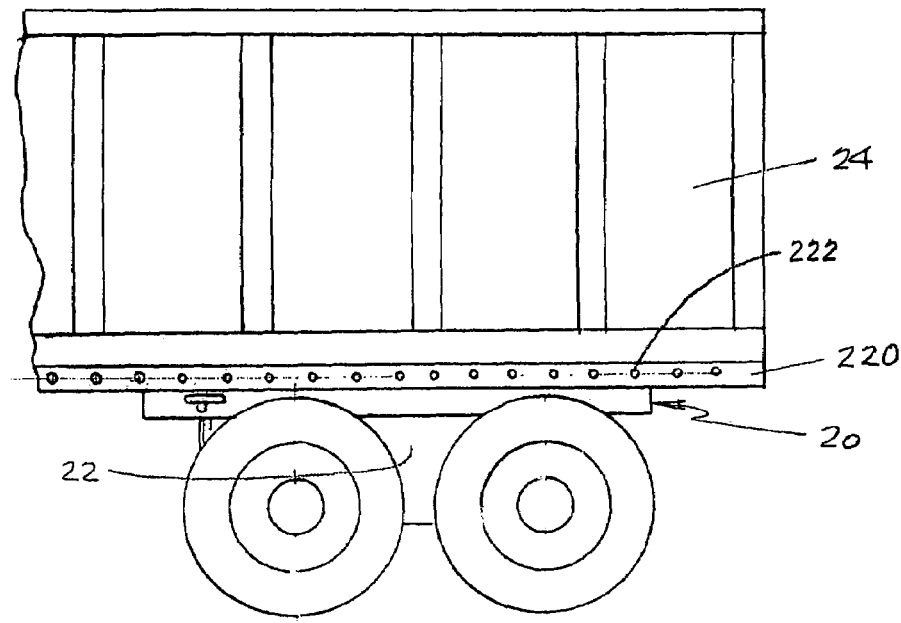
FIG. 1A is a schematic view of a slider assembly, vehicle body and vehicle suspension wherein the vehicle suspension is locked in one position relative to the vehicle body.
Figure 1B:
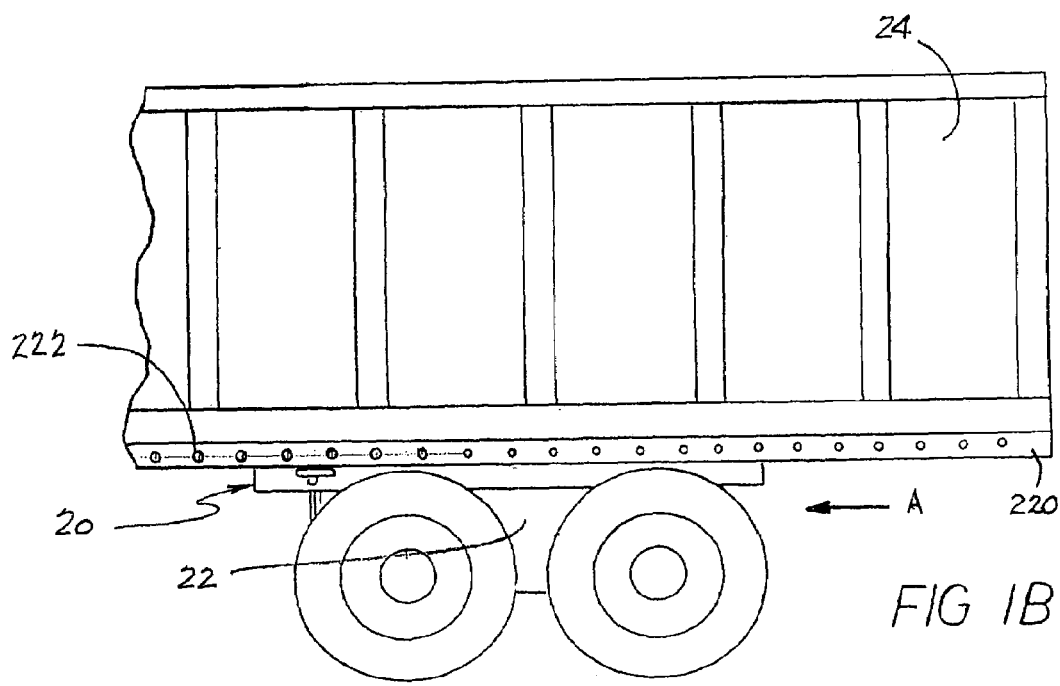
FIG. 1B is a schematic view of the slider assembly, the vehicle body and the vehicle suspension wherein the vehicle suspension is locked in another position relative to the vehicle body wherein the slider assembly and vehicle suspension has been moved to the left (direction shown by the arrow "A") from the position shown in FIG. 1A.
Figure 2:
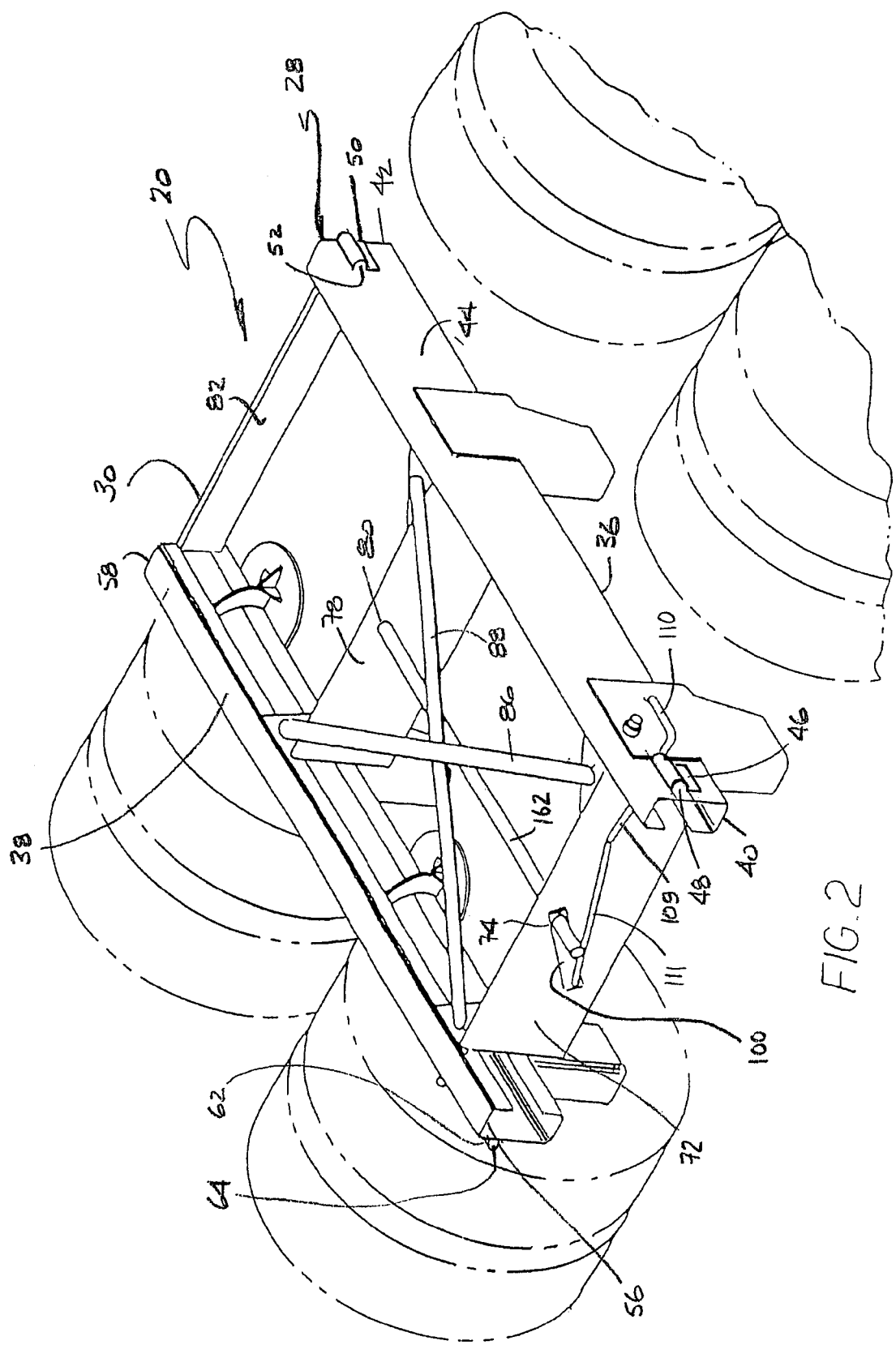
FIG. 2 is a perspective view of the slider assembly taken from a generally forward direction wherein the vehicle suspension is shown in schematic.
Figure 3:
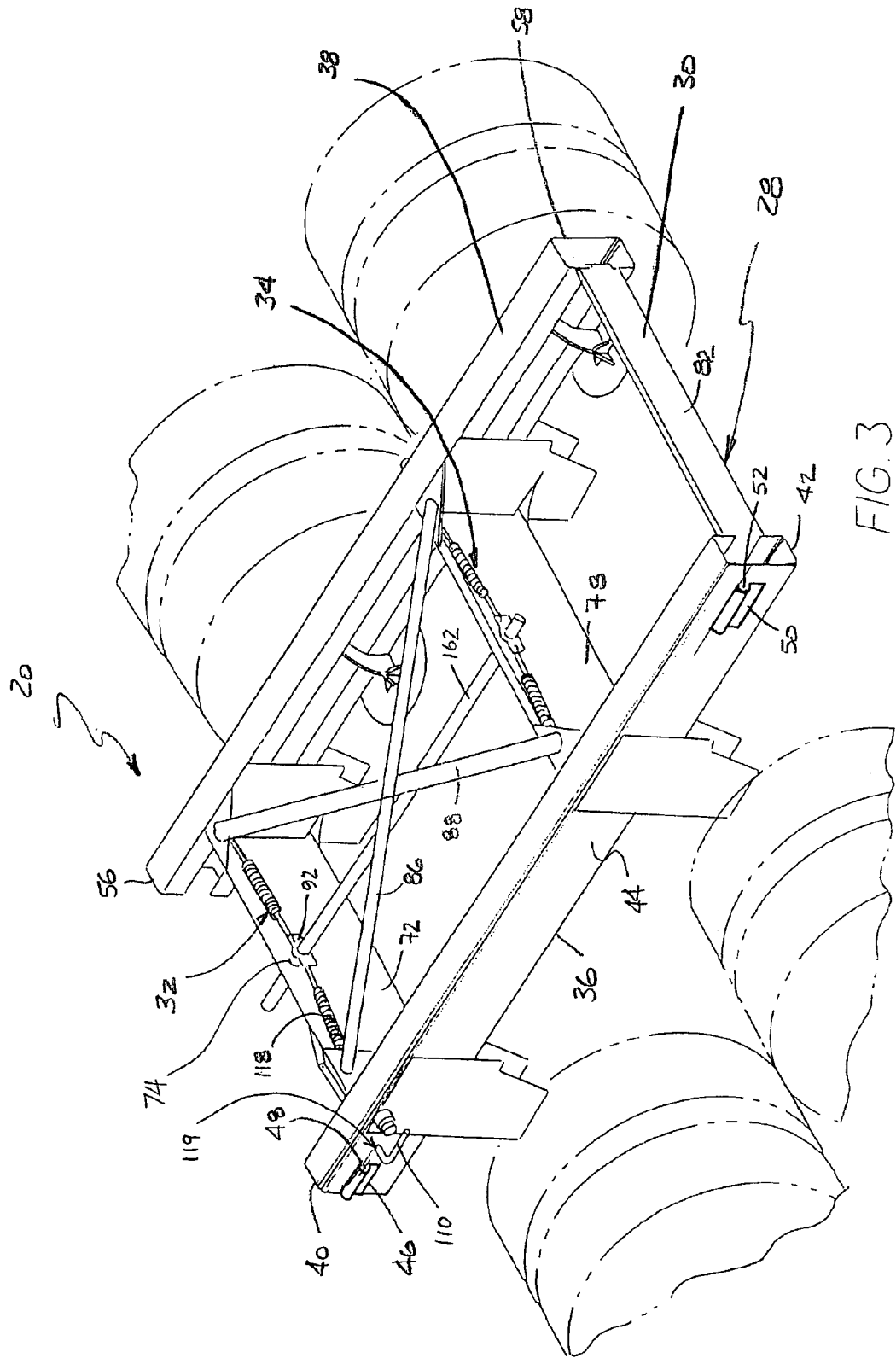
FIG. 3 is an perspective view of the slider assembly taken from a generally rearward direction wherein the vehicle suspension is shown in schematic.

Referring to the drawings, FIG. 1A shows a slider assembly constructed in accordance with the principles of the present invention and generally designated as 20. The slider assembly 20 is fixedly connected to a vehicle suspension system 22. The slider assembly 20 is selectively slidably connected to the vehicle body 24. FIG. 1A shows the vehicle body 24 in a first position or spatial relation with respect to the vehicle suspension 22. In this first position, as shown in FIG. 1A, the slider assembly 20 is in a locked condition so as to be fixedly connected to the vehicle body 24 so that the relative position of the vehicle body 24 and vehicle suspension 22 remains fixed in place. If there comes a time when the relative position of the vehicle body 24 and vehicle suspension 22 must be changed, then the slider assembly 20 can be moved to an unlocked condition so that the vehicle body 24 is slidable with respect to the slider assembly 20 and vehicle suspension 22. In this regard, FIG. 1B shows the vehicle suspension 22 moved to the left relative to the vehicle body 24 in the direction of arrow "A" from the position shown in FIG. 1A. Once the relative position of the vehicle body 24 and the vehicle suspension 22 has been changed, the slider assembly 20 can be moved to the locked condition so as to secure together the vehicle body 24 and the vehicle suspension 22.

The slider assembly 20 includes a frame assembly generally designated as 28. The frame assembly 28 includes a frame 30 of a generally rectangular shape, a forward locking mechanism generally designated as 32, and a rearward locking mechanism generally designated as 34.

Frame 30 includes one elongate longitudinal member 36 and another elongate longitudinal member 38. These longitudinal members (36, 38) are transversely spaced apart and are disposed generally parallel to each other. The one longitudinal member 36 has a forward end 40 and a rearward end 42. The one longitudinal member 36 presents an exterior surface 44 that has a forward bracket 46 attached thereto. Forward bracket 46 includes a channel 48. A rearward bracket 50 is also attached to the longitudinal member 36 on the exterior surface 44 thereof. Rearward bracket 50 contains a channel 52. The other longitudinal member 38 has a forward end 56 and a rearward end 58. The other longitudinal member 38 presents an exterior surface 60 that has a forward bracket 62 attached thereto. Forward bracket 62 includes a channel 64. A rearward bracket 66 is also attached to the other longitudinal member 38 on the exterior surface 60 thereof. Rearward bracket 66 contains a channel 68.

Frame 30 further includes a forward transverse member 72 that contains an aperture 74. Frame 30 also includes a mediate transverse member 78 that contains an aperture 80. Frame 30 additionally includes a rearward transverse member 82. Frame 30 also includes a pair of stabilizer arms 86 and 88 that extend between the opposite sides of the forward transverse member 72 and the mediate transverse member 78. Shaft 162 extends through aperture 74 of forward transverse member 72 and aperture 80 of mediate transverse member 78 and is pivotally supported therein so as to rotate about its longitudinal axis.

The forward locking mechanism 32 includes a first pivot arm 92 that contains a pair of oppositely disposed apertures 94 and 96, and a central aperture 98. The forward locking mechanism 32 further includes a first crank arm 100 that has a proximate end 102 and a distal end 104. First crank arm 100 has an aperture 106 near the proximate end 102 and an aperture 107 near the distal end 104. Shaft 162 extends through the central aperture 98 of pivot arm 92 and through aperture 106 or crank arm 100 and is affixed to each of the pivot arm 98 and crank arm 100 by welding or other suitable means such that the pivot arm 98 and crank arm 100 rotate with the shaft 162.

The forward locking mechanism 32 further includes an articulated pull rod 108 that has an exterior section 109 that has an exterior end or handle 110, and an interior section 111 that has an interior end 112. A bend 114 joins the interior section 111 and the exterior section 109. The exterior section 109 includes a pair of spaced apart notches 116 and 117.

Figure 4:
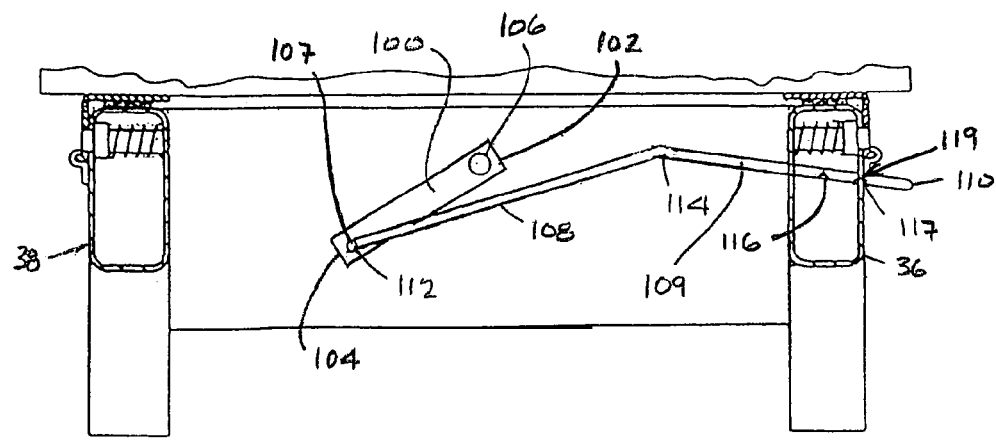
FIG. 4 is a front view of the slider assembly showing the crank arm and the pull rod and wherein the longitudinal members are cross-sectioned and the slider assembly is connected to the vehicle body.

The exterior section 109 of pull rod 108 extends through an aperture 119 in longitudinal member 36 such that notches 116 and 117 may engage member 36 at the aperture 119. As more fully discussed herein below, when the pull rod 108 is in the position shown in FIG. 4 with notch 117 engaged to member 36 at aperture 119, the slider assembly 20 is in its locked condition. However, when the pull rod 108 is pulled out and placed in the position shown in FIG. 6B with notch 116 engaged to member 36 at aperture 119, the slider assembly 20 is in its unlocked condition.

The forward locking mechanism 32 also includes a first compression spring 118 that has one end 120 and an opposite end 122. There is a first locking pin 124 that has one end 126 and an opposite other end 128. First locking pin 124 has a head portion 130 adjacent the one end 126 thereof and a shank 134 adjacent the other end 128 thereof. A shoulder 132 separates the head portion 130 and the shank 134 and is disposed mediate of the one end 126 and the other end 128. There is a first extension spring 136 disposed between the shoulder 132 and the interior surface 138 of the one longitudinal member 36. Although it is described in more detail hereinafter, the first extension spring 136 exerts an extension bias on the first locking pin 124 so as to urge the first locking pin 124 in an outward direction. The first compression spring 118 is connected at its one end 120 to the first locking pin 124 at the other end 128 thereof. The compression spring 118 is also connected at its other end 122 to the first pivot arm 92 at the one aperture 94 thereof. Although it is described in more detail hereinafter, the first compression spring 118 may be in a relaxed position where it does not exert any bias on the first locking pin 124. The first compression spring 118 may also be placed in a compressed position where it exerts a compression bias on the first locking pin 124 so as to bias the first locking pin 124 in an inward direction. The compression bias of compression spring 118 is of a greater strength or magnitude than the extension bias of the extension spring 136.

The forward locking mechanism 32 also includes a second compression spring 140 that has one end 142 and an opposite end 144. There is a second locking pin 146 that has one end 148 and an opposite other end 150. Second locking pin 146 has a head portion 152 adjacent the one end 148 thereof and a shank 156 adjacent the other end 150 thereof. A shoulder 154 separates the head portion 152 and the shank 156 and is disposed mediate of the one end 148 and the other end 150. There is a second extension spring 158 disposed between the shoulder 154 and the interior surface 160 of the other longitudinal member 38. Although it is described in more detail hereinafter, the second extension spring 158 exerts an extension bias on the second locking pin 146 so as to urge the second locking pin 146 in an outward direction. The second compression spring 140 is connected at its one end 142 to the second locking pin 146 at the other end 150 thereof. The second compression spring 140 is also connected at its other end 144 to the first pivot arm 92 at the other aperture 96 thereof. Although it is described in more detail hereinafter, the second compression spring 140 may be in a relaxed position where it does not exert any bias on the second locking pin 146. The second compression spring 140 may also be placed in a compressed position where it exerts a compression bias on the second locking pin 146 so as to bias the second locking pin 146 in an inward direction. The compression bias of compression spring 140 is of a greater strength or magnitude than the extension bias of extension spring 158.

Referring to the rearward locking mechanism 34, the rearward locking mechanism 34 includes a second pivot arm 164 that contains a pair of oppositely disposed apertures 166 and 168, and a central aperture 170. Shaft 162 extends through central aperture 170 of the second pivot arm 164 and is affixed thereto by welding or other suitable means such that the second pivot arm 164 also rotates with shaft 162.

The rearward locking mechanism 34 also includes a third compression spring 172 that has one end 174 and an opposite end 176. There is a third locking pin 178 that has one end 180 and an opposite other end 182. Third locking pin 178 has a head portion 184 adjacent the one end 180 thereof and a shank 188 adjacent the other end 182 thereof. A shoulder 186 separates the head portion 184 and the shank 188 and is disposed mediate of the one end 180 and the other end 182. There is a third extension spring 190 disposed between the shoulder 186 and the interior surface 138 of the one longitudinal member 36. Although it is described in more detail hereinafter, the third extension spring 190 exerts an extension bias on the third locking pin 178 so as to urge the third locking pin 178 in an outward direction. The third compression spring 172 is connected at its one end 174 to the third locking pin 178 at the other end 182 thereof. The third compression spring 172 is also connected at its other end 176 to the second pivot arm 164 at the other aperture 166 thereof. Although it is described in more detail hereinafter, the third compression spring 172 may be in a relaxed position where it does not exert any bias on the third locking pin 178. The third compression spring 172 may also be placed in a compressed position where it exerts a compression bias on the third locking pin 178 so as to bias the third locking pin 178 in an inward direction. The compression bias of compression spring 172 is of a greater strength or magnitude than the extension bias of extension spring 190.

The rearward locking mechanism 34 also includes a fourth compression spring 194 that has one end 196 and an opposite end 198. There is a fourth locking pin 200 that has one end 202 and an opposite other end 204. Fourth locking pin 200 has a head portion 212 adjacent the one end 202 thereof and a shank 216 adjacent the other end 204 thereof. A shoulder 214 separates the head portion 212 and the shank 216 and is disposed mediate of the one end 202 and the other end 204. There is a fourth extension spring 218 disposed between the shoulder 214 and the interior surface 160 of the other longitudinal member 38. Although it is described in more detail hereinafter, the fourth extension spring 218 exerts an extension bias on the fourth locking pin 200 so as to urge the fourth locking pin 200 in an outward direction. The fourth compression spring 194 is connected at its one end 196 to the fourth locking pin 200 at the other end 204 thereof. The fourth compression spring 194 is also connected at its other end 204 to the second pivot arm 164 at the one aperture 166 thereof. Although it is described in more detail hereinafter, the fourth compression spring 194 may be in a relaxed position where it does not exert any bias on the fourth locking pin 200. The fourth compression spring 194 may also be placed in a compressed position where it exerts a compression bias on the fourth locking pin 200 so as to bias the fourth locking pin 200 in an inward direction. The compression bias of compression spring 194 is of a greater strength or magnitude than the extension bias of extension spring 218.

Figure 7:
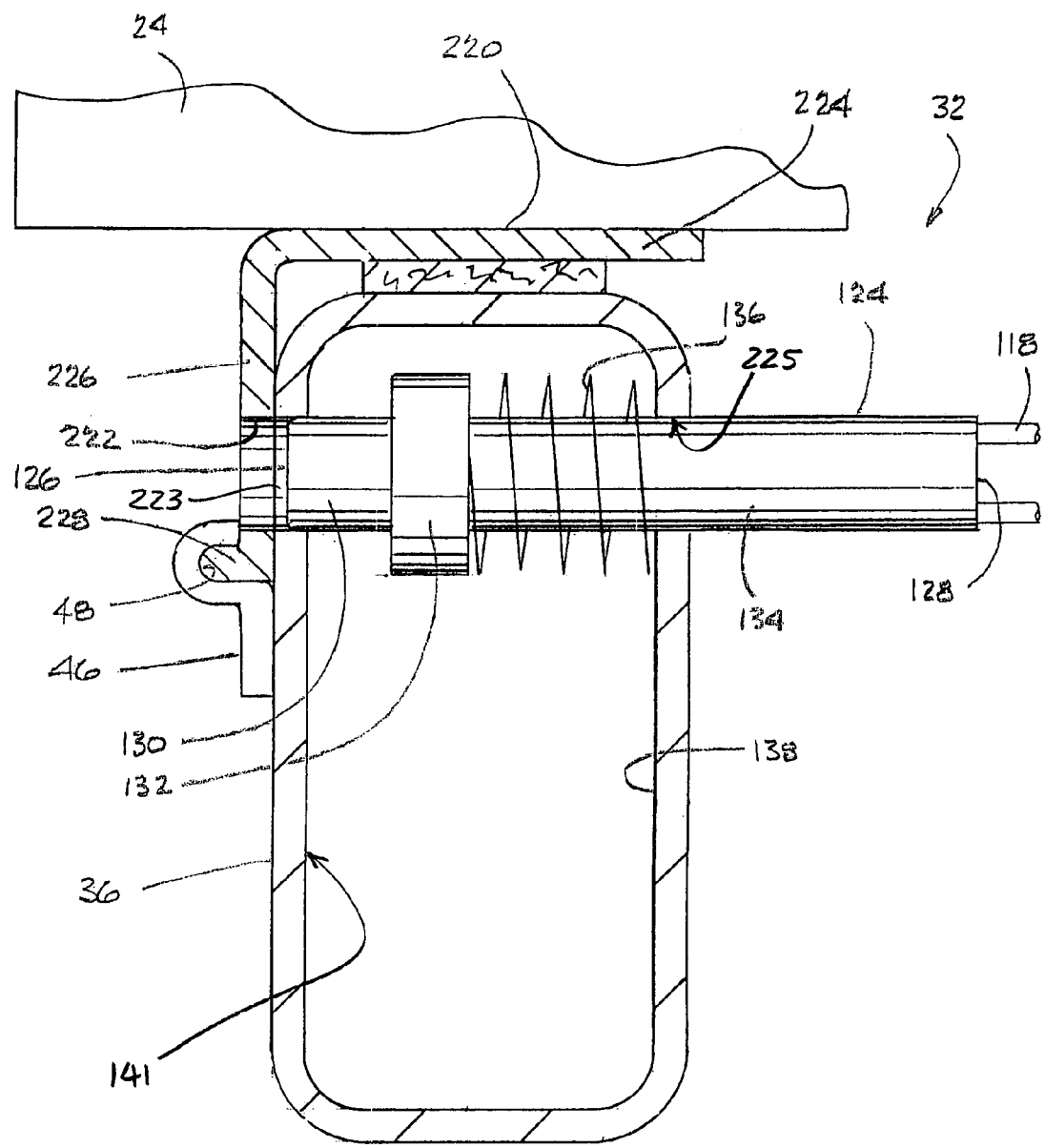
FIG. 7 is an enlarged view of a part of the assembly showing a locking pin and the connection between the vehicle body and the slider assembly; and, FIG. 8 is an enlarged view of the first compression spring.
Figure 8:
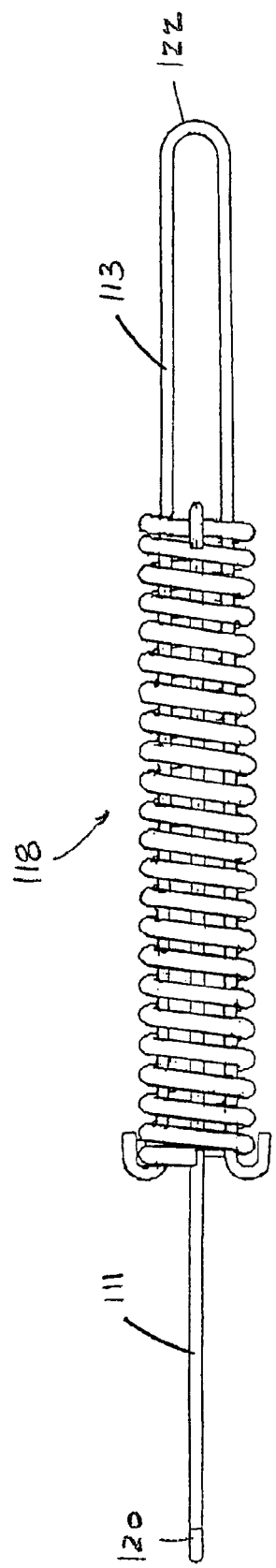

A pair of slider rails 220 are affixed to the vehicle body 24 so that one of the slider rails 220 corresponds to and is in selective operative engagement with the one longitudinal member 36 and the other slider rail 220 corresponds to and is in selective operative engagement with the other longitudinal member 38. Each slider rail 220 contains a plurality of apertures 222 therein. The slider rails 220 present a structure along the lines of the structure of the slider rails shown in earlier patents such as, for example, U.S. Pat. No. 4,838,578 to Baxter. As is shown in FIG. 7, each slider rail 220 has a base portion 224 that connects to the vehicle body 24. Each slider rail 220 further includes an integral arm 226 that depends from the base 224 wherein there is a flange 228 at the distal end of the arm 226. The flange 228 is received within the channel (48, 52, 64, 68) of each one of the brackets (46, 50, 62, 66) on the longitudinal members (36, 38) so as to provide for a slidable connection between the slider assembly 20 and the vehicle body 24.

As described hereinabove, the slider assembly 20 is selectively fixedly connected to the vehicle suspension 22. The vehicle body 24 is positioned above the slider assembly 20 so that each one of the slider rails 220 extends along and over its corresponding one of the longitudinal members 36 and 38 of the frame 30. The slider assembly 20 is selectively and intentionally placed in either a locked condition or an unlocked condition.

As best seen in FIG. 7, each of the four locking pins (124, 146, 178, 200) extend through and are supported by outboard apertures 223 and inboard apertures 225 extending through the longitudinal members 36 and 38. When the slider assembly 20 is in the locked condition, each one of the four locking pins (124, 146, 178, 200) extend beyond their outboard apertures 223 and engage their respective apertures 222 in the slider rails 220 so as to secure the vehicle body 24 to the slider assembly 20. This results in a secure connection between the vehicle body 24 and the vehicle suspension 22.

Figure 6A:
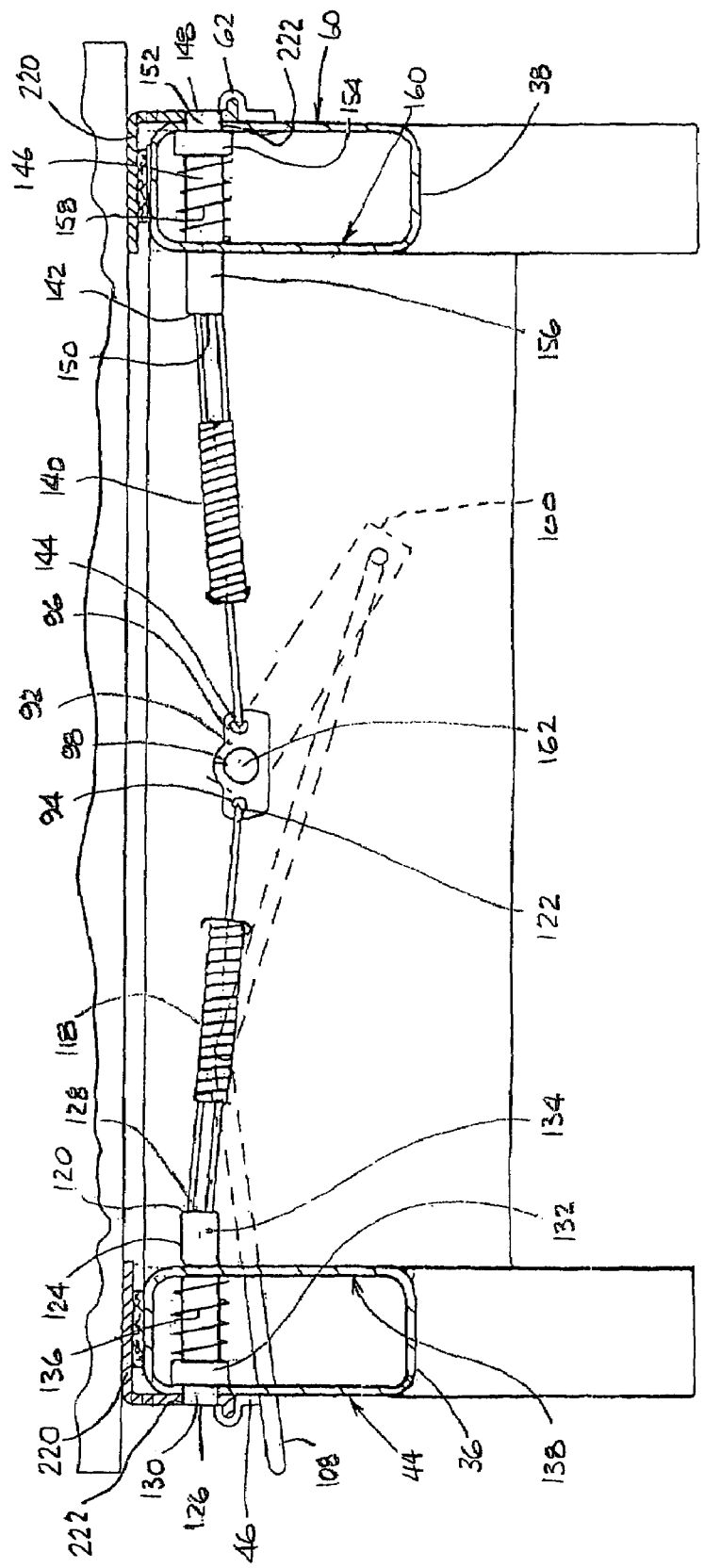
FIG. 6A is a mechanical schematic view of the forward locking mechanism wherein the first and second extension springs bias their respective first and second locking pins in an extended condition and each one of the first and second compression springs is in a relaxed condition whereby the first and second locking pins engage their corresponding apertures in the corresponding slider rails of the vehicle body.

Referring to FIG. 6A, for the slider assembly 20 to be in locked condition, the first pivot arm 92 must be in a locked position as shown. When the first pivot arm 92 is in this locked position, the first compression spring 118 is not compressed (and is in a relaxed position), and hence, does not exert a compression bias on the first locking pin 124. The first extension spring 136 continually exerts an extension bias on the first locking pin 124 so as to bias the first locking pin 124 in an outward direction. It should be appreciated that the first compression spring 118 exerts a compression bias on the first locking pin 124 in a direction opposite to the direction of the extension bias exerted to the first locking pin 124 by the first extension spring 136. When the first compression spring 118 does not exert any compression bias on the first locking pin 124, the first extension spring 136 is free to successfully bias the first locking pin 124 in an outward direction and into engagement with its corresponding aperture 222 in the slider rail 220.

Still referring to FIG. 6A, when the first pivot arm 92 is in the locked position as shown, the second compression spring 140 is also not compressed (and is in a relaxed position), and hence, does not exert a compression bias on the second locking pin 146. The second extension spring 158 continually exerts an extension bias on the second locking pin 146 so as to bias the second locking pin 146 in an outward direction. It should be appreciated that the second compression spring 140 exerts a compression bias on the second locking pin 146 in a direction opposite to the direction of the extension bias exerted on the second locking pin 146 by the second extension spring 158. When the second compression spring 140 does not exert any compression bias on the second locking pin 146, the second extension spring 158 is free to successfully bias the second locking pin 146 in an outward direction and into engagement with its corresponding aperture 222 in the slider rail 220.

The operation of the rearward locking mechanism 34 is essentially the same as that described above in connection with the forward locking mechanism 32. In this regard, referring to FIG. 5, for the slider assembly 20 to be in locked condition, the second pivot arm 164 is in a locked position as shown. When the second pivot arm 164 is in this locked position, the third compression spring 172 is not compressed, and hence, does not exert a compression bias on the third locking pin 178. The third extension spring 190 continually exerts an extension bias on the third locking pin 178 so as to bias the third locking pin 178 in an outward direction. It should be appreciated that the third compression spring 172 exerts a compression bias on the third locking pin 178 in a direction opposite to the direction of the extension bias exerted to the third locking pin 178 by the third extension spring 190. When the third compression spring 172 does not exert any bias on the third locking pin 178, the third extension spring 190 is free to successfully bias the third locking pin 178 in an outward direction and into engagement with its corresponding aperture 222 in the slider rail 220.

Figure 5:
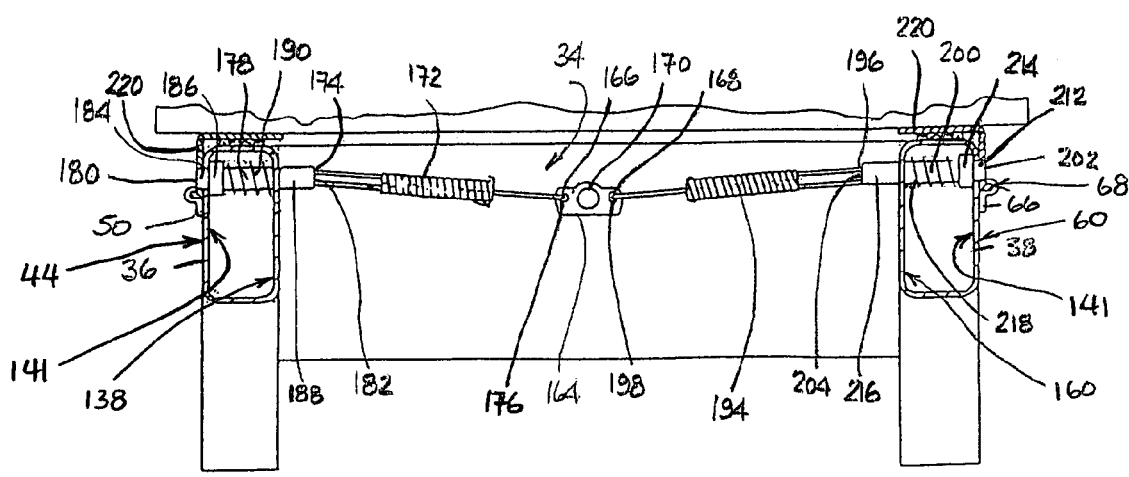
FIG. 5 is a rear view of the slider assembly showing the rearward locking mechanism and wherein the longitudinal members are cross-sectioned and the slider assembly is connected to the vehicle body.

Still referring to FIG. 5, when the second pivot arm 164 is in the locked position as shown, the fourth compression spring 194 is not compressed, and hence, does not exert a bias on the fourth locking pin 200. The fourth extension spring 218 continually exerts an extension bias on the fourth locking pin 200 so as to bias the fourth locking pin 200 in an outward position. It should be appreciated that the fourth compression spring 194 exerts a compression bias on the fourth locking pin 200 in a direction opposite to the direction of the extension bias exerted on the fourth locking pin 200 by the fourth extension spring 218. When the fourth compression spring 194 does not exert any bias on the fourth locking pin 200, the fourth extension spring 218 is free to successfully bias the fourth locking pin 200 in an outward direction into engagement with its corresponding aperture 222 in the slider rail 220.

Figure 6B:
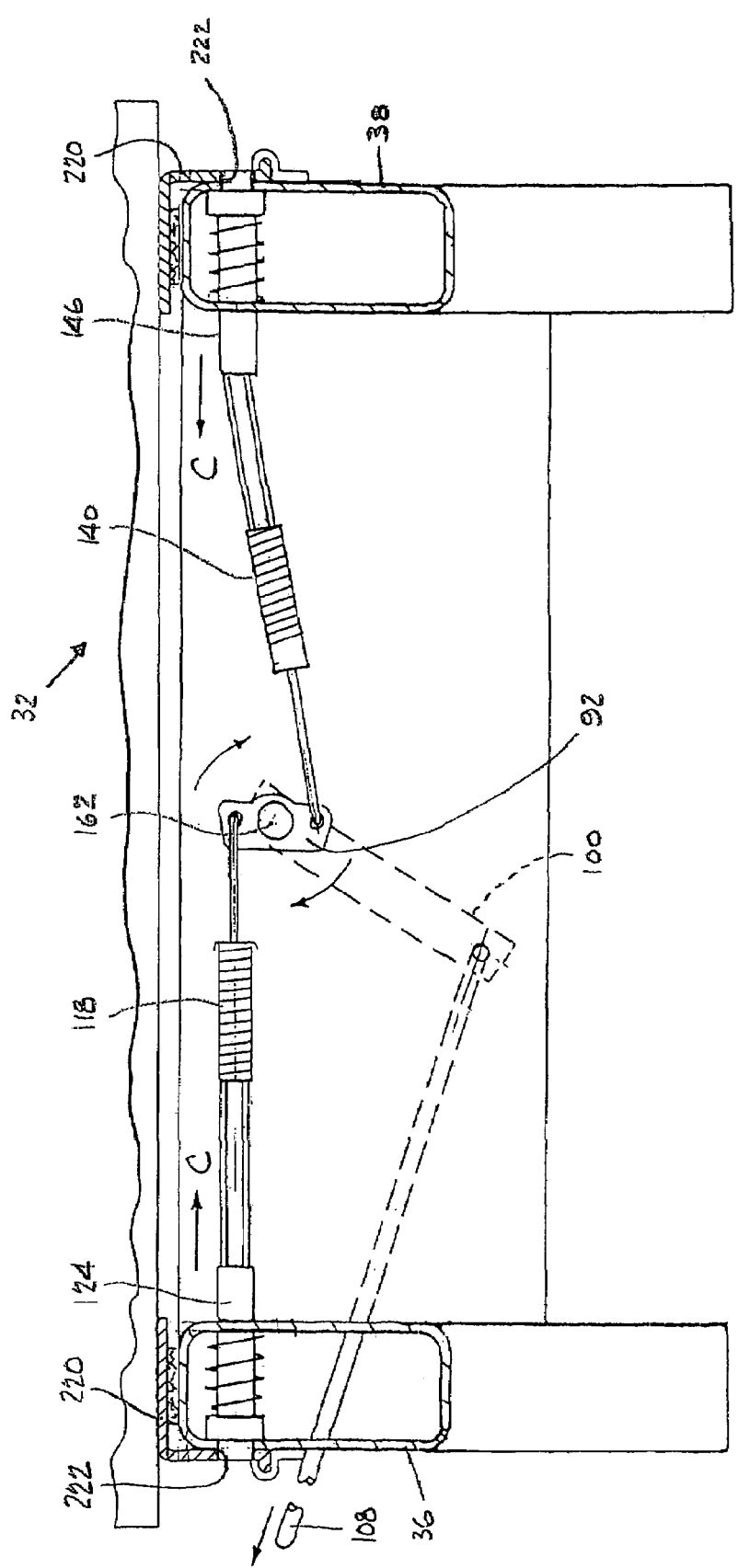
FIG. 6B is a mechanical schematic view of the forward locking mechanism shown in a condition wherein the first and second locking pins are stuck in their respective apertures in the slider rail so that the first and second extension springs bias their first and second locking pins is in an expanded condition and first and second compression springs are in a compressed condition exerting a compression bias on their respective locking pins.
Figure 6C:
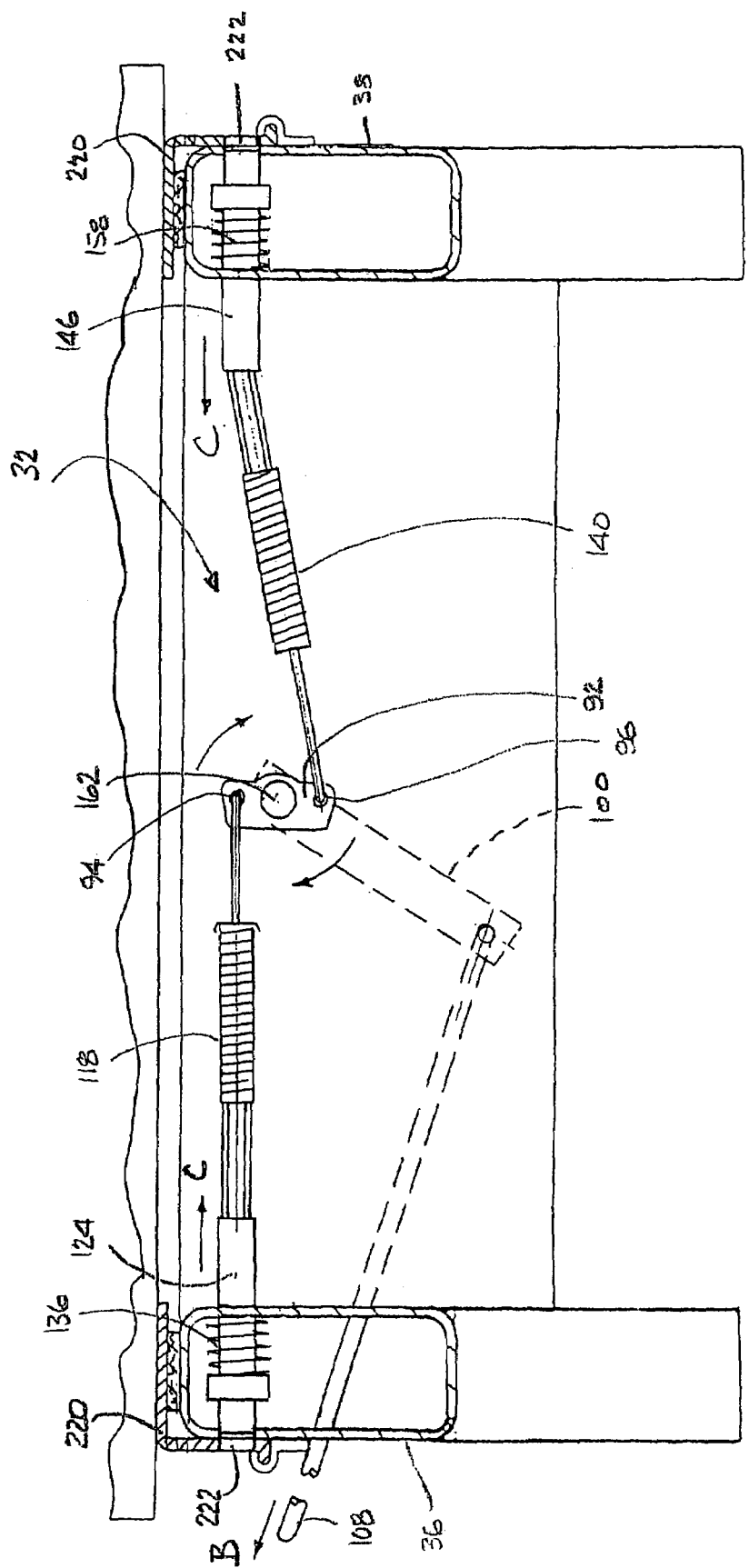
FIG. 6C is a mechanical schematic view of the forward locking mechanism wherein the first and second extension springs that bias their respective first and second locking pins are in a compressed condition and the first and second compression springs are in a compressed condition so as to exert the dominant bias on their corresponding locking pins so that the locking pins are not in engagement in their corresponding apertures in the slider rails of the vehicle body.

When the vehicle is in use, the slider assembly 20 is in the locked position so that vehicle suspension 22 is fixed in a selected position relative to the vehicle body 24 so as to provide suitable support for the load carried by the vehicle body 24. It is typical that from time to time there will be a need to change the position of the vehicle suspension 22 relative to the vehicle body 24. In order to make this change, the slider assembly 20 must be moved from the locked condition to the unlocked condition. FIG. 6C illustrates the slider assembly 20 when it is in the unlocked condition, and in particular, shows the forward locking mechanism 32.

When it is necessary to move the slider assembly 20 from the locked condition to the unlocked condition, the operator pulls on the pull rod 108 so as to pull it outwardly relative to the frame 30 and placing notch 116 in engagement with member 36 at aperture 119. This engagement retains pull rod 108 in the unlocked position. The direction in which the operator pulls the pull rod 108 is shown by the arrow identified by "B". The pull rod 108 is pivotally connected to the crank arm 100, and the crank arm 100 is rigidly connected to the shaft 162. The full movement of the pull rod 108 causes the crank arm 100 to move from the position shown in FIG. 6A to the position shown in FIG. 6C. This movement causes the shaft 162 to rotate so as to rotate the first pivot arm 92 and the second pivot arm 164 to be in the position shown in FIGS. 6C and 60.

When the slider assembly 20 is in the unlocked condition as shown in FIG. 6C, the first pivot arm 92 has been moved to its unlocked position. During the movement of the first pivot arm 92, the first compression spring 118 is moved inwardly relative to (or away from) the first locking pin 124. The strength of the operator and the stiffness of the first compression spring 118 are each greater than the extension bias exerted by the first extension spring 136 on the first locking pin 124 so that the movement of the first compression spring 118 under the influence of the first pivot arm 92 overcomes the extension bias of the first extension spring 136 on the first locking pin 124 thereby moving (or biasing) the first locking pin 124 in an inward direction (the direction of arrow "C") out of engagement with its corresponding aperture 222 in the corresponding slider rail 220.

A corresponding sequence of events occurs with respect to the second compression spring 140 and its operation on the second locking pin 146. More specifically, when the slider assembly 20 is in the unlocked condition as shown in FIG. 6C, the first pivot arm 92 has been moved to its unlocked position. During the movement of the first pivot arm 92, the second compression spring 140 is moved inwardly relative to (or away from) the second locking pin 146. The strength of the operator and the stiffness of the second compression spring 140 are each sufficiently greater than the extension bias exerted by the second extension spring 158 on the second locking pin 146 so that the movement of the second compression spring 140 under the influence of the first pivot arm 92 overcomes the extension bias of the second extension spring 158 on the second locking pin 146 thereby moving (or biasing) the second locking pin 146 in an outward direction and out of engagement with its corresponding aperture 222 in the corresponding slider rail 220.

It should also be appreciated a still further corresponding sequence of events occurs with respect to the operation of the rearward locking mechanism 34 when the operator pulls the pull rod 108 away from the frame 30. In this regard, the movement of the pull rod 108 causes the shaft 162 to rotate so as to rotate the second pivot arm 164 so as to be in a position like that shown in FIG. 6D.

Figure 6D:
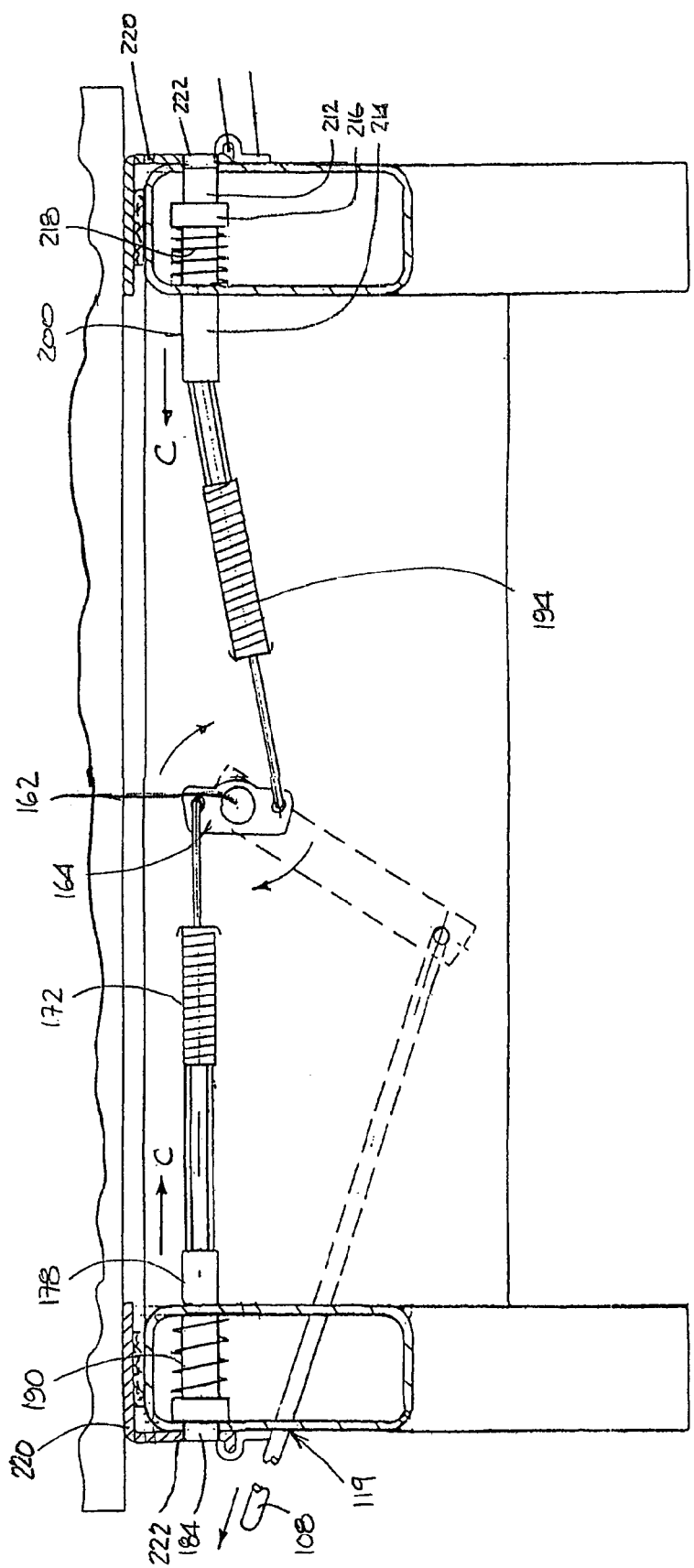
FIG. 6D is a mechanical schematic view of the rearward locking mechanism wherein the third locking pin is stuck in its respective aperture in the slider rail so that the third extension spring that biases the third locking pin is in an expanded condition and third compression spring is in a compressed condition exerting a compression bias on the third locking pin, and wherein the fourth extension spring that biases its respective fourth locking pin is in a compressed condition and the fourth compression spring is in a compressed condition so as to exert the dominant bias on its corresponding fourth locking pin so that the fourth locking pin is not in engagement with its corresponding aperture in the slider rails of the vehicle body.

When the slider assembly 20 is in the unlocked condition as shown in FIG. 6D, the second pivot arm 164 has been moved to its unlocked position. During the movement of the second pivot arm 164, the third compression spring 172 is moved inwardly relative to (or away from) the third locking pin 178. The strength of the operator and the stiffness of the third compression spring 172 are each sufficiently greater than the extension bias exerted by the third extension spring 190 on third locking pin 178 so that the movement of the third compression spring 172 under the influence of the second pivot arm 164 overcomes the extension bias of the third extension spring 190 on the third locking pin 178 thereby moving (or biasing) the third locking pin 178 in an inward direction and out of engagement with its corresponding aperture 222 in the corresponding slider rail 220.

A corresponding sequence of events occurs with respect to the fourth compression spring 194 and its operation on the fourth locking pin 200. More specifically, when the slider assembly 20 is in the unlocked condition like that shown in FIG. 6D, the second pivot arm 164 has been moved to its unlocked position. During the movement of the second pivot arm 164, the fourth compression spring 194 is moved inwardly relative to (or away from) the fourth locking pin 200. The strength of the operator and the stiffness of the fourth compression spring 194 are each sufficiently greater than extension bias exerted by the fourth extension spring 218 on the fourth locking pin 200 so that the movement of the fourth compression spring 194 under the influence of the second pivot arm 164 overcomes the extension bias of the fourth extension spring 218 on the fourth locking pin 200 thereby moving (or biasing) the fourth locking pin 200 in an inward direction and out of engagement with its corresponding aperture 222 in the corresponding slider rail 220.

Once all of the locking pins (124, 146, 178 and 200) have been disengaged from their respective apertures 222 in the slider rails 220, the operator is able to slide the vehicle body 24 relative to the vehicle suspension 22 and thereby adjust the relative position of the vehicle body 24 and the vehicle suspension 22. As can be appreciated, the ability of the slider assembly 20 to selectively allow the relative position of the vehicle body 24 and the vehicle suspension 22 to be changed permits the vehicle suspension 22 to provide optimum support for the weight of the vehicle body 24 and any load carried thereby.

Once the vehicle body 24 has been positioned at a desired location relative to the vehicle suspension 22, the operator moves the pull rod 108 inwardly placing notch 117 thereof in engagement with member 36 at aperture 119. The inward movement of the pull rod 108 causes the crank arm 100 to rotate the shaft 162 so as to move the first pivot arm 92 and the second pivot arm 164 into their locked positions. When the first pivot arm 92 is in its locked position the first compression spring 118 does not exert a compression bias on the first locking pin 124, and this allows the first extension spring 136 to bias the first locking pin 124 in an outward direction into engagement with the appropriate aperture 222 in the corresponding slider rail 220. When the first pivot arm 92 is in its locked position the second compression spring 140 is in a relaxed position so that it does not exert a biasing force on the second locking pin 146 and this allows the second extension spring 158 to bias the second locking pin 146 in an outward direction and into engagement with the appropriate aperture 222 in the corresponding slider rail 220.

As can be appreciated, movement of the pull rod 108 inwardly to the locked position also causes the rotation of the shaft 162 and the second pivot arm 164 to move to its locked position. When the second pivot arm 164 moves to its locked position, the third compression spring 172 does not exert a compression biasing force on the third locking pin 178 so that the third extension spring 190 can bias the third locking pin 178 in an outward direction and into engagement with the appropriate aperture 222 in the corresponding slider rail 220. When the second pivot arm 92 is in its locked position the fourth compression spring 194 does not exert a compression biasing force on the fourth locking pin 200 so that the fourth extension spring 218 can bias the fourth locking pin 200 in an outward direction and into engagement with the appropriate aperture 222 in the corresponding slider rail 220.

After the pull rod 108 along with the first pivot arm 92 and the second pivot arm 164 are in their locked position and the locking pins (124, 146, 178, 200) are engaged in their respective apertures 222 of the slider rails 220, the vehicle body 24 is securely connected to the vehicle suspension 22 so that the vehicle is able to be operated without risk that the vehicle body 24 will become detached from the slider assembly 20 and the vehicle suspension 22.

Sometimes during the operation of the vehicle, dirt and other debris may become lodged in one or more of the apertures 222 in the slider rails 220 that are engaged by a corresponding one of the locking pins. The presence of this dirt and debris and/or other reasons such as the locking pin being "pinched" between the slider rail aperture 222 and its outboard aperture 223 can cause one or more of the locking pins to become stuck in its respective aperture 222 so that upon movement of the pull rod 108 from the locked position to the unlocked position, the locking pin will not become disengaged from the aperture 222. As can be appreciated, this is an undesirable situation since the engagement of even one of the locking pins (124, 146, 178, 200) prevents the vehicle body 24 from being slidable with respect to the vehicle suspension 22. This condition prevents any change of the relative position of the vehicle body 24 to the vehicle suspension 22.

The slider assembly 20 provides a feature that assists in the disengagement of a stuck locking pin from its corresponding aperture. In this regard, a condition is depicted wherein in FIG. 6B both the first and second locking pins 124 and 146 of the forward locking mechanism 32 are stuck in their respective apertures 222, and in FIG. 6D the third locking pin 178 is stuck in its respective aperture 222 while the fourth locking pin 200 is not stuck and has been moved inwardly out of engagement with its corresponding aperture 222. That is, although the operator pulled out and placed the pull rod 108 in the unlocked position with notch 116 in engagement with member 36, the stuck locking pins 124, 146 and 178 remained in their locked position wherein they remain extended into their respective apertures 222. However, because the pull rod 108 is retained in the unlocked position via the engagement of notch 116 with member 36 at aperture 119, the first and second pivot arms 92 and 164 are also retained in their unlocked position as shown in FIGS. 6B and 6D. As can be appreciated, this causes the compression springs 118, 140 and 172 of respective stuck pins 124, 146 and 178 to be placed in compression and thereby maintain an inwardly extending bias or force on each of the stuck pins toward their unlocked position. The operator may then "jostle" the vehicle in a known and customary manner so as to reduce the resistance or essentially free the locked pins. As the stuck pins become unstuck, the inward bias or force of the compression springs overcome the outward bias or force of the extension springs thereby causing the locking pins to be pulled out of their respective apertures 222 and be placed in their unlocked position. That is, because the compression springs 118, 140 and 172 are stiffer or have a greater bias or force than their respective extension springs 136, 158 and 190, the compression springs overcome the force of the extension springs thereby allowing the respective locking pins to be retracted inwardly to their unlocked positions.

It is noted that the terms "extension spring" and "compression spring" as used herein are merely intended to be descriptive as to the operation of these springs on the locking pins, and not the type of springs that could be used to accomplish such operation. An "extension spring" as used herein is intended to mean a spring that causes a locking pin to "extend" outwardly toward an aperture 222. A "compression spring" as used herein is intended to mean a spring that provides a compressive or retracting force between a locking pin and a pivot arm for retracting or moving the locking pin out of an aperture 222. In fact, the preferred extension springs 136, 158, 190 and 218, as shown, are technically compression springs in that they tend to resist a compressive force. It is contemplated that an extension spring, one that normally resists an extension force thereon, could also be used by locating it around the locking pins and attaching its one end to the inside surface 141 of the outside walls of members 36 and 38 and at attaching its other end to the respective locking pin, such that the spring will resist extension and normally pull the locking pins outwardly into their locked position. It is further noted that the preferred compression springs 118, 140, 172 and 194, as shown, are technically compression springs in that they resist a compressive force when hook members 111 and 113 are pulled apart from one another at their respective ends 120 and 122. It is however contemplated that extension springs could be used instead for connection between their respective pivot arms and locking pins and which resist extension thereof so that, when in the locked position, such springs are relaxed and when in their unlocked position such springs are pulled apart and extended for thereby providing the compressive or pulling force between the respective pivot arms and locking pins. In any event, regardless of the type of springs used for the extension springs and the compression springs, the springs 118, 140, 172 and 194 will have a compressive biasing force which is greater than the outward or extension biasing force of their respective springs 136, 158, 190 and 218 at their respective locking pins.

As should be appreciated, after all the stuck pins are caused to be unstuck and are caused to be retracted in their unlocked positions, the slider assembly 20 and suspension 22 is slid or moved as desired with respect to the vehicle body 24. At that point, for again locking the slider assembly 20 and suspension 22 securely together with the vehicle body 24, the operator moves the pull rod 108 back to the locked position as, for example, shown in FIGS. 4, 5 and 6A. The pull rod 108 is retained in this position again by the engagement of the notch 117 with member 36 at aperture 119. In the unlocked position, pivot arms 92 and 164 are rotated to a position as shown in FIGS. 5 and 6A thereby decreasing or eliminating any compressive force or tension that may have existed in the compression springs and allowing the extension springs to create a bias or force on their respective locking pin and causing the locking pin to be extended outwardly and into an aligned aperture 222 of rails 220. That is, in the locked position, the compression springs 118, 140, 172 and 194 do not exert any bias or force on the locking pins such that the respective extension springs 136, 158, 190 and 218 provide the necessary bias or force so as to cause their respective locking pins 124, 146, 178 and 200 to be extended or moved outwardly or outboard for engagement within a respective aperture 222 of rails 220.

It is noted that when the pull rod 108 is placed in the locked position, it is possible for one or more of the locking pins to not be aligned with an aperture 222 such that the locking pin will not be immediately extended into an aperture 222. However, with the pivot arms 92 and 164 in their locked position, the compression springs 118, 140, 172 and 194 do not provide any bias or force against their respective locking pins and, in fact, the respective extension springs 136, 158, 190 and 218 provide a continuous bias or force on their respective locking pins 124, 146, 178 and 200. Accordingly, the operator again merely jostles or slightly moves the vehicle body 24 with respect to the slider assembly 20 and suspension 22 such that, upon alignment of any locking pin with its respective aperture 222, the locking pin will immediately be caused to be extended or move outward or outboard and into its respective aperture 222 of rail 220 and thereby placing the respective locking pin in its locked position. It is further noted that, once placed in its locked position, each of the locking pins are assured to remain in such locked position while the pull rod 108 is in the locked position because each of the extension springs 136, 158, 190 and 218 will continue to exert a bias or force on their respective locking pins, while the respective compression springs do not exert any force as they remain in a relaxed position.

The patents, patent applications, and other documents identified herein are hereby incorporated by reference herein.

Other embodiments of the invention will be apparent to those skilled in the art from a consideration of the specification of the practice of the invention disclosed herein. It is intended that the specification and examples be considered as illustrative only, and that the true spirit and scope of the invention being indicated by the following claims.

What is claimed is:

1. A slider assembly providing a connection between a vehicle body and a vehicle suspension, the slider assembly comprising:
    a frame;
    a locking mechanism attached to the frame, the locking mechanism comprising:
        a locking pin movable in and out of engagement with the vehicle body;
        a first spring adjacent the locking pin;
        a pivot arm movable between a locked position and an unlocked position;
        a second spring between the pivot arm and the locking pin;
    when the pivot arm is in the locked position, the second spring does not exert a bias on the locking pin and the first spring exerts a bias on the locking pin so as to bias the locking pin into engagement with the vehicle body so as to secure together the vehicle body and the vehicle suspension; and,
    when the pivot arm is in the unlocked position, the second spring exerts a bias on the locking pin that overcomes the bias of the first spring thereby biasing the locking pin out of engagement with the vehicle body so that the vehicle body is slidable with respect to the vehicle suspension.

2. The slider assembly of claim 1 wherein the first spring is an extension spring and the second spring is a compression spring, and the bias of the compressed compression spring on the locking pin is greater than the bias of the extension spring on the locking pin.

3. The slider assembly of claim 1 further including a crank arm being operatively connected to the pivot arm, and the crank arm being movable between a locked position in which the pivot arm is in the locked position and an unlocked position in which the pivot arm is in the unlocked position.

4. The slider assembly of claim 3 further including a central shaft connected to the pivot arm, and the crank arm being connected to the central shaft whereby the shaft and the pivot arm rotate upon movement of the crank arm.

5. The slider assembly of claim 4 further including a pull rod connected to the crank arm, the pull rod being longitudinally movable between a locked position and an unlocked position.

6. The slider assembly of claim 5 wherein the pull rod includes a pair of notches that selectively engage the frame so as to prevent the longitudinal movement of the pull rod, one of the notches corresponding to the locked position and the other of the notches corresponding to the unlocked position.

7. The slider assembly of claim 1 wherein the second spring is movable between a relaxed position when the pivot arm is in the locked position and a compressed position when the pivot arm is in the unlocked position.

8. The slider assembly of claim 1 wherein the first spring exerts a direct bias on the locking pin.

9. The slider assembly of claim 1 wherein the second spring exerts a direct bias on the locking pin when the pivot arm is in the unlocked position.

10. The slider assembly of claim 1 wherein the first spring exerts a bias on the locking pin during both the locked and unlocked positions and the second spring exerts a direct bias on the locking pin when the pivot arm is in the unlocked position.

11. A slider assembly providing a connection between a vehicle body and a vehicle suspension, the slider assembly comprising:
    a frame;
    a locking mechanism attached to the frame, the locking mechanism comprising:
        a first locking pin connected to a first extension spring;
        a first pivot arm movable between a locked position and an unlocked position;
        a first compression spring connecting the pivot arm and the first locking pin;
        a second locking pin connected to a second extension spring;
        a second compression spring connecting the first pivot arm and the second locking pin;
    when the first pivot arm is in the locked position, the first compression spring does not exert a bias on the first locking pin and the first extension spring exerts a bias on the first locking pin so as to bias the first locking pin into engagement with the vehicle body so as to secure together the vehicle body and the vehicle suspension, and the second compression spring does not exert a bias on the second locking pin and the second extension spring exerts a bias on the second locking pin so as to bias the second locking pin into engagement with the vehicle body so as to secure together the vehicle body and the vehicle suspension; and, when the pivot arm is in the unlocked position, the first compression spring exerts a bias on the first locking pin that overcomes the bias of the first extension spring on the first locking pin thereby biasing the first locking pin out of engagement with the vehicle body so that the vehicle body is slidable with respect to the vehicle suspension, and the second compression spring exerts a bias on the second locking pin that overcomes the bias of the second extension spring on the second locking pin thereby biasing the second locking pin out of engagement with the vehicle body so that the vehicle body is slidable with respect to the vehicle suspension.

12. The slider assembly of claim 11 wherein the locking mechanism further includes:
a second pivot arm, and a shaft connecting the first pivot arm and the second pivot arm, and the second pivot arm being movable between a locked position and an unlocked position;
a third locking pin connected to a third extension spring;
a third compression spring connecting the second pivot arm and the third locking pin;
a fourth locking pin connected to a fourth extension spring;
a fourth compression spring connecting the second pivot arm and the fourth locking pin;
when the second pivot arm is in the locked position, the third compression spring does not exert a bias on the third locking pin and the third extension spring exerts a bias on the third locking pin so as to bias the third locking pin into engagement with the vehicle body so as to secure together the vehicle body and the vehicle suspension, and the fourth compression spring does not exert a bias on the fourth locking pin and the fourth extension spring exerts a bias on the fourth locking pin so as to bias the fourth locking pin into engagement with the vehicle body so as to secure together the vehicle body and the vehicle suspension; and,
when the second pivot arm is in the unlocked position, the third compression spring exerts a bias on the third locking pin that overcomes the bias of the third extension spring on the third locking pin thereby biasing the third locking pin out of engagement with the vehicle body so that the vehicle body is slidable with respect to the vehicle suspension, and the fourth compression spring exerts a bias on the fourth locking pin that overcomes the bias of the fourth extension spring on the fourth locking pin thereby biasing the fourth locking pin out of engagement with the vehicle body so that the vehicle body is slidable with respect to the vehicle suspension.

13. The slider assembly of claim 12 further including a crank arm being movable between a locked position and an unlocked position, and the crank arm being secured to the shaft so that upon movement of the crank arm to the locked position the shaft rotates to place the first pivot arm and the second pivot arm in the locked position, and upon movement of the crank arm to the unlocked position the shaft rotates to place the first pivot arm and the second pivot arm in the unlocked position.

14. The slider assembly of claim 11 wherein the first compression spring is movable between a relaxed position when the first pivot arm is in the locked position and a compressed position when the first pivot arm is in the unlocked position, and the second compression spring is movable between a relaxed position when the first pivot arm is in the locked position and a compressed position when the first pivot arm is in the unlocked position.

15. The slider assembly of claim 11 wherein the first extension spring exerts a direct bias on the first locking pin, and the second extension spring exerts a direct bias on the second locking pin.

16. The slider assembly of claim 11 wherein, when the pivot arm is in the unlocked position, the first compression spring exerts a direct bias on the first locking pin, and the second compression spring exerts a direct bias on the second locking pin.

17. The slider assembly of claim 11 wherein the first extension spring exerts a bias on the first locking pin during both the locked and unlocked positions and the first compression spring exerts a direct bias on the first locking pin when the pivot arm is in the unlocked position, and the second extension spring exerts a bias on the second locking pin during both the locked and unlocked positions and the second compression spring exerts a direct bias on the second locking pin when the pivot arm is in the unlocked position.

18. A vehicle comprising:
a vehicle body;
a vehicle suspension;
a slider assembly, the slider assembly connecting the vehicle body and the vehicle suspension, the slider assembly being movable between a locked condition wherein the vehicle body and the vehicle suspension are secured together and an unlocked condition wherein the vehicle body and the vehicle suspension are slidingly adjustable with respect to each other;
the slider assembly comprising:
a frame assembly;
the frame assembly including a locking mechanism, the locking mechanism comprising:
a locking pin movable in and out of engagement with the vehicle body;
a first spring adjacent the locking pin;
a pivot arm movable between a locked position and an unlocked position;
a second spring connecting the pivot arm and the locking pin;
when the pivot arm is in the locked position the second spring does not exert a bias on the locking pin so that the first spring biases the locking pin into engagement with the vehicle body so as to secure together the vehicle body and the vehicle suspension; and,
when the pivot arm is in the unlocked position the second spring exerts a bias on the locking pin so as to overcome the bias of the first spring so as to bias the locking pin out of engagement with the vehicle body so that the vehicle body is slidable with respect to the vehicle suspension.

19. The vehicle of claim 18 wherein the vehicle body further includes a slide rail containing a plurality of apertures, and when the slider assembly is in the locked condition the locking pin engaging a selected one of the apertures in the slide rail.

20. The vehicle of claim 18 wherein the first spring is an extension spring and the second spring is a compression spring and the bias of the compressed compression spring on the locking pin is greater than the bias of the extension spring on the locking pin.

21. The vehicle of claim 18 further including a crank arm being operatively connected to the pivot arm, and the crank arm being movable between a locked position in which the pivot arm is in the locked position and an unlocked position in which the pivot arm is in the unlocked position.

22. The vehicle of claim 21 further including a central shaft being connected to the pivot arm, and the crank arm being connected to the central shaft whereby the shaft and the pivot arm rotate upon movement of the crank arm.

23. The vehicle of claim 22 further including a pull rod connected to the crank arm, the pull rod being longitudinally movable between a locked position and an unlocked position.

24. The vehicle of claim 18 wherein the second spring is movable between a relaxed position when the pivot arm is in the locked position and a compressed position when the pivot arm is in the unlocked position.

25. The vehicle of claim 18 wherein the first spring exerts a direct bias on the locking pin.

26. The vehicle of claim 18 wherein the second spring exerts a direct bias on the locking pin when the pivot arm is in the unlocked position.

27. The vehicle of claim 18 wherein the first spring exerts a bias on the locking pin during both the locked and unlocked positions and the second spring exerts a direct bias on the locking pin when the pivot arm is in the unlocked position.

* * * * *